United States Patent [19]
Hassinger

[11] 3,915,385
[45] Oct. 28, 1975

[54] VEHICLE HEADLAMP WASHING SYSTEM
[76] Inventor: Donald F. Hassinger, 728 Onondaga Ave., Ann Arbor, Mich. 48104
[22] Filed: Mar. 13, 1975
[21] Appl. No.: 558,159

[52] U.S. Cl. ............................ 239/284; 240/7.1 R
[51] Int. Cl.² ........................ B05B 1/10; B60S 1/46
[58] Field of Search ................. 239/284; 240/7.1 R; 15/250.01, 250.02

[56] References Cited
UNITED STATES PATENTS
| | | | |
|---|---|---|---|
| 3,469,088 | 9/1969 | Coleman et al. | 239/284 |
| 3,866,840 | 2/1975 | Harkrider | 240/7.1 R |

Primary Examiner—Lloyd L. King
Attorney, Agent, or Firm—Olsen and Stephenson

[57] ABSTRACT

A system for enabling remote controlled cleaning of the headlamps on a vehicle such as an automobile wherein compressed air is utilized both to project a cleaning fluid onto the headlamp and to blow the cleaning fluid off the headlamp for drying purposes. The system includes circular discharge nozzles which are disposed slightly forwardly of the headlamps and have a plurality of discharge orifices directed toward various portions of the headlamp surface. The cleaning fluid includes abrasive particles suspended therein to loosen and remove foreign material on the headlamp surface.

5 Claims, 4 Drawing Figures

VEHICLE HEADLAMP WASHING SYSTEM

BACKGROUND OF THE INVENTION

The inability of vehicle headlights to adequately illuminate the road surface ahead of the vehicle is becoming of increasing concern from a safety standpoint. Vehicle headlights which are capable initially of illuminating the road surface with sufficient brightness often become incapable of performing this vital function because of the accumulation of foreign material on the headlamp surfaces. The present invention provides a solution to this problem and provides a system that enables the vehicle driver to periodically wash the headlamps without leaving the driver's seat.

SUMMARY OF THE INVENTION

The headlamp washing system of this invention consists of a reservoir for cleaning fluid having compressed air therein capable of projecting the cleaning fluid under pressure from the reservoir. Discharge nozzles encircle the headlamps and are connected by a first passage to the bottom portion of the reservoir. As a result, when a valve in the first passage is opened, cleaning fluid in the reservoir is forced through the first passage into the discharge nozzle. The discharge nozzle is also connected by a second passage to an upper portion of the reservoir so that when the second passage is opened compressed air from the reservoir is discharged from the nozzle. This enables the vehicle operator to provide first for a discharging of cleaning fluid onto the headlamp followed by a discharge of drying air onto the headlamp.

The cleaning fluid contains abrasive particles and the propelling of these abrasive particles in the cleaning fluid media onto the headlamp acts to remove foreign material that will not dissolve in the cleaning fluid. This inclusion of abrasive particles in the cleaning fluid enhances the ability of the system to clean the headlamps. Also, the discharge orifices are located in the nozzle so that some of the nozzles direct the cleaning fluid onto a central area of the headlamp and others of the nozzles direct the cleaning fluid onto edge portions of the headlamp. This arrangement of the discharge orifices provides for a complete cleaning of the headlamp surface.

The system of this invention thus provides for efficient washing of the vehicle headlamps to thereby insure adequate illumination of the road surface ahead of the vehicle for safety purposes.

Further objects, features and advantages of the invention will become apparent from a consideration of the following description, the appended claims and the accompanying drawing in which:

Figure 1:
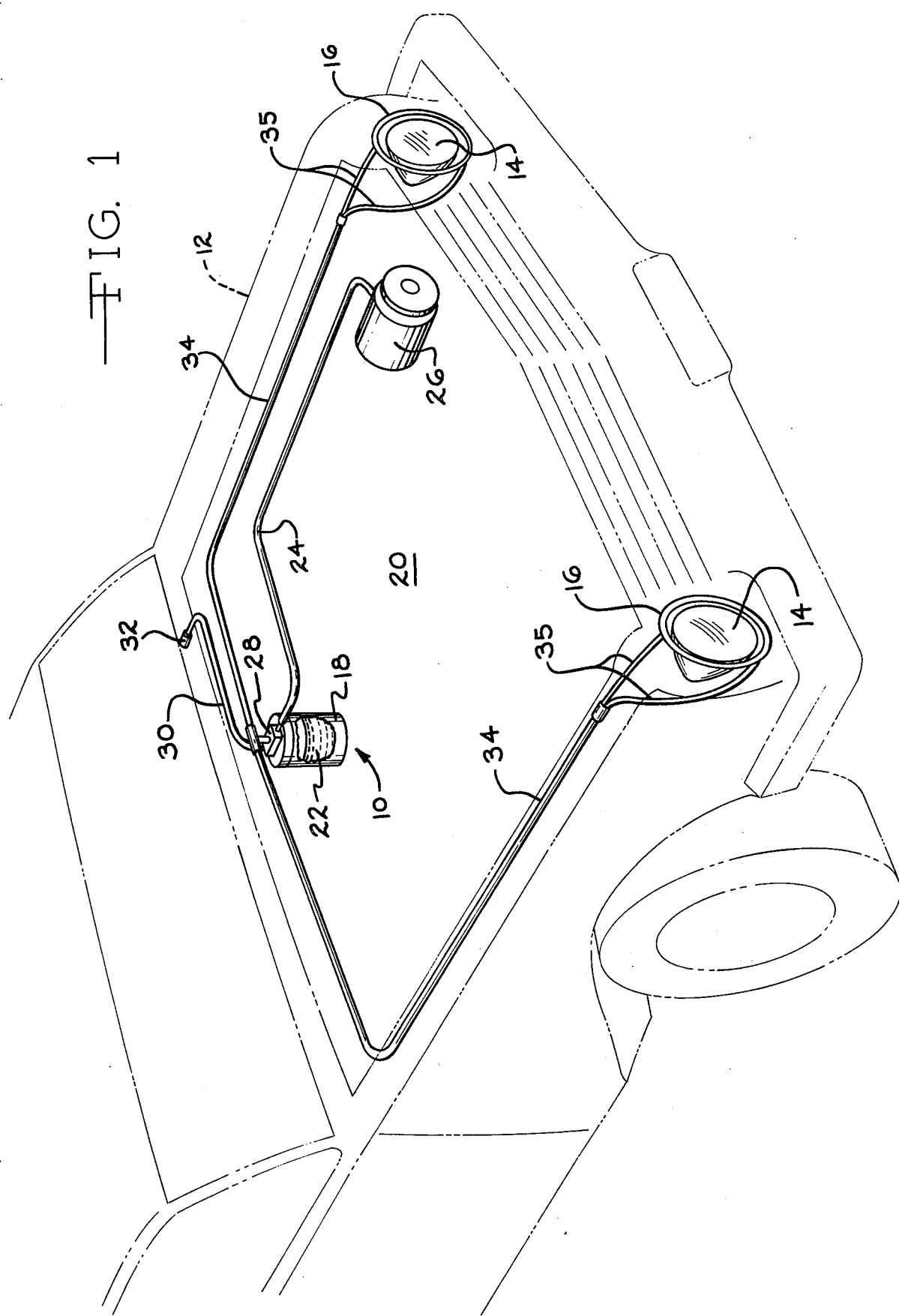
FIG. 1 is a foreshortened perspective view of an automobile, shown in broken lines, illustrating the headlamp washing system of this invention in assembly relation therewith.

With reference to the drawing, the system of this invention, indicated generally at 10, is illustrated in FIG. 1 in assembly relation with an automobile 12 having the usual headlamps 14. The system 10 consists of a pair of discharge nozzles 16 which encircle the headlamps 14 and are connected to a reservoir 18 mounted under the vehicle hood 20 and containing a cleaning fluid 22. The reservoir 18 is connected by a passage member 24 to a compressor 26 which provides a supply of compressed air to the reservoir 18 so as to pressurize the cleaning fluid 22.

A solenoid valve assembly 28 is mounted on the reservoir 18 and connected by electrical control wires 30 to a control switch assembly 32 mounted on the vehicle dashboard at a convenient location for the vehicle driver. The valve assembly 28 is connected by passage members 34 to the discharge nozzles 16. In the illustrated embodiment of the invention, two passage members 34 extend from the valve assembly 28 and each member 34 broches out into two sections 35 which are connected to diametrically opposite sides of a nozzle member 16.

Figure 2:
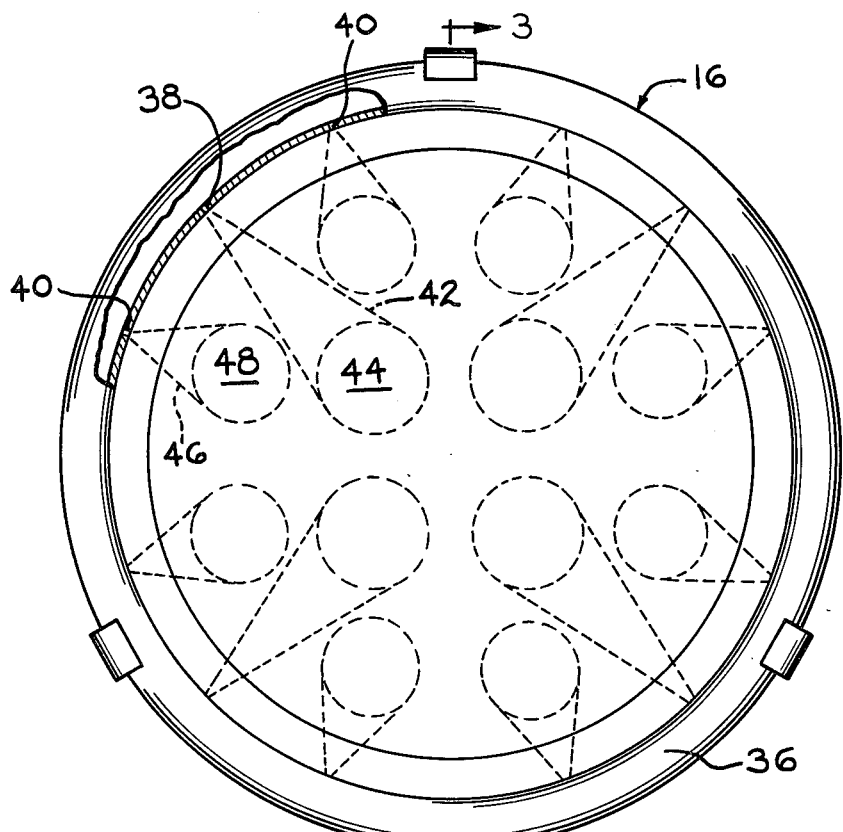
FIG. 2 is a front view of a vehicle headlamp showing a discharge nozzle in the system of this invention in assembly relation with the headlamp, with part of the nozzle broken away for purposes of clarity and illustrating in broken lines the discharge pattern of the orifices in the nozzle.
Figure 3:
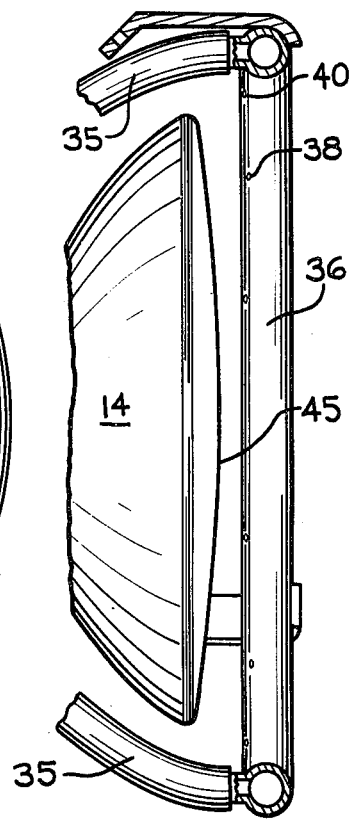
FIG. 3 is a fragmentary side elevation view of a vehicle headlamp illustrating, in transverse section, the discharge nozzle of this invention in assembly relation therewith.

As best appears in FIGS. 2 and 3, each nozzle 16 consists of a tubular body 36 formed to a circular shape having a diameter greater than the diameter of the headlamp 14. Each body member 36 is formed with a plurality of discharge orifices 38 and 40. Each of the orifices 38 is located and formed in the body member 36 so that fluid discharged therefrom will be dispersed in the triangular pattern shown in dotted lines at 42 in FIG. 3 and will be directed against a radially inner portion 44 of the front headlamp surface 45. The orifices 40 are likewise formed and located in the body 36 so that each will direct a jet of cleaning fluid in the triangular path, indicated at 46, onto an edge portion 48 of the headlamp assembly spaced radially outwardly from the portion 44. Thus, as shown in FIG. 2, fluid discharged from the orifices 38 and 40 will be directed against portions 44 and 48 of the headlamp assembly which are spaced about the headlamp surface 45 and substantially cover the surface. This provides for efficient washing of the headlamp surface.

Figure 4:
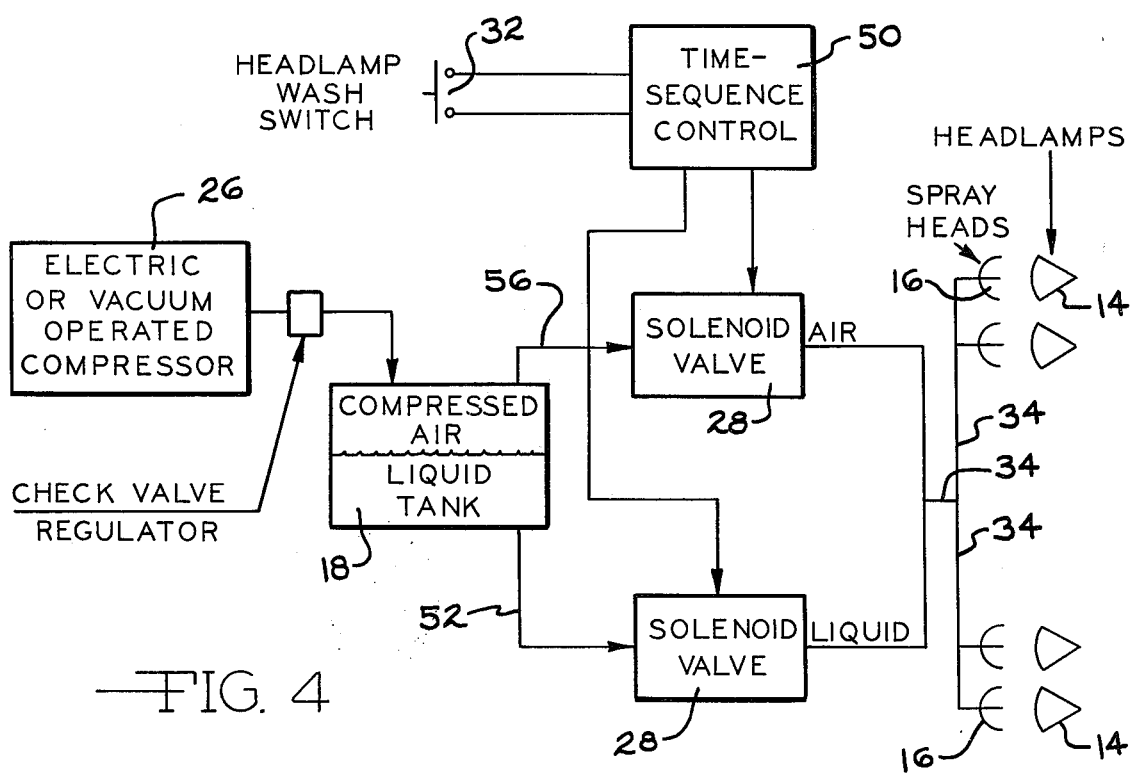
FIG. 4 is a diagramatic view of the headlamp washing system of this invention.

In the use of the system 10 of this invention, when it is desired to clean the headlamps 14, the vehicle driver actuates the switch 32 (FIG. 4) to in turn actuate a time-sequence control unit 50 connected to the solenoid valve 28, which for convenience, is illustrated in two parts in FIG. 4. The valve 28 provides first for communication of a liquid line 52 that extends into a lower portion of the reservoir 18 with the passage member 34 connected to the discharge nozzles 16. As a result, cleaning fluid 22 is projected rearwardly and inwardly from the nozzle bodies 36 through the discharge orifices 38 and 40 onto spaced portions 44 and 48 of the front headlamp surfaces 45. The cleaning fluid 22 functions, in a manner hereinafter described, to loosen and dissolve foreign particles on the surface 45 that are reducing the illuminating ability of the headlamp 14. Following discharge of the cleaning liquid 22 onto the headlamps 14 the solenoid valve 28 operates to close the passage 52 and open a passage 56 which communicates with an upper portion of the reservoir 18. This causes a discharge of compressed air through the passage member 34 into the discharge nozzles 16. This air is directed through the orifice 38 and 40 onto the headlamp surfaces 45 so as to dry the surfaces 45 and blow the loosened foreign material thereon off the surfaces 45. The result is a cleaned surface 45 with reduced tendency to block the passage of light.

An important feature of the present invention is the content of the cleaning fluid 22. Conventionally, such fluid contains a solvent. However, some foreign material on vehicle headlamp surfaces 45 cannot be effectively dissolved. An example is dried bugs that are adhered to the surface 45. In the present invention, an abrasive material is suspended in the fluid 22 and this abrasive material, when discharged through the orifice 38 and 40, acts to rub the foreign particles that won't dissolve off the surface 45. The solid abrasive particles are maintained in suspension in the cleaning fluid 22 by the normal motion of the vehicle 12. Consequently, these particles are efficiently transported by the fluid 22 onto the headlamp surfaces 45. In a preferred embodiment of the invention, the abrasive particles consist of finely powdered pumice. An example of a suitable mixture of materials to make the cleaning liquid 22 is as follows, the amounts listed providing approximately one quart of the abrasive-cleaner-solvent 22:

600 ml. isopropyl alcohol (provides anti-freeze and rapid drying properties)
400 ml. water (acts as cleaner and solvent)
1.5 g. finely powdered pumice (abrasive material)
3 ml. propylene glycol (surfactant)
0.5 ml. concentrated low foam detergent (cleaner)
1 ml. morpholene (degreaser and pH adjustment)
1 ml. pentane (degreaser)

From the above description it is seen that this invention provides an improved headlamp washing system 10 in which the compressed air that is used to propel the cleaning liquid 22 onto the headlamps 14, is also used subsequently to dry and clean the headlamps 14. The inclusion of an abrasive material in the cleaning fluid 22 and the utilization of the normal movement of the vehicle 12 to maintain the abraisive particles in suspension in the liquid 22 insures the necessary full cleaning of the headlamps 14. Furthermore, the pattern of the discharge orifices 38 and 40 in the circular discharge nozzles 16 insures the desired complete cleaning of the headlamps 14.

What is claimed is:

1. In a vehicle having at least one headlamp, a system for washing the headlamp comprising a reservoir for cleaning fluid, means providing for a supply of compressed air in said reservoir for expelling said cleaning fluid therefrom, a discharge nozzle encircling said headlamp, first passage means connecting a bottom portion of said reservoir and said discharge nozzle for delivering fluid from the reservoir to the nozzle to wash the headlamp, second passage means connecting an upper portion of said reservoir and said discharge nozzle for delivering air to said nozzle to dry said headlamp, and valve means interposed in said passage means and operable to provide for sequential opening of said passage means so that said headlamp is first washed and then dried.

2. A vehicle headlamp washing system according to claim 1 wherein said cleaning fluid has abrasive particles suspended therein.

3. A vehicle headlamp washing system according to claim 2 wherein said abrasive particles consist of finely powdered pumice.

4. A vehicle headlamp washing system according to claim 1 wherein said discharge nozzle comprises a tubular ring member extending around and disposed forwardly of said headlamp, said ring member having a plurality of discharge orifices therein directed inwardly and rearwardly toward the surface of said headlamp.

5. A vehicle headlamp washing system according to claim 4 wherein some of said orifices are directed toward edge portions of said surface and others of said orifices are directed toward radially inner portions of said surface.

* * * * *